(12) United States Patent
Yamamoto

(10) Patent No.: US 9,800,165 B2
(45) Date of Patent: Oct. 24, 2017

(54) PROTECTION CIRCUIT AND SWITCHING POWER SUPPLY

(71) Applicant: Onkyo Corporation, Osaka (JP)

(72) Inventor: Kazuki Yamamoto, Osaka (JP)

(73) Assignee: ONKYO CORPORATION, Osaka (JP)

( * ) Notice: Subject to any disclaimer, the term of this patent is extended or adjusted under 35 U.S.C. 154(b) by 0 days.

(21) Appl. No.: 15/406,843

(22) Filed: Jan. 16, 2017

(65) Prior Publication Data
US 2017/0222564 A1 Aug. 3, 2017

(30) Foreign Application Priority Data

Feb. 1, 2016 (JP) .................................. 2016-017062

(51) Int. Cl.
*H02M 3/335* (2006.01)
*H02M 1/32* (2007.01)

(52) U.S. Cl.
CPC ......... *H02M 3/33523* (2013.01); *H02M 1/32* (2013.01)

(58) Field of Classification Search
CPC ....................................................... H02M 1/32
See application file for complete search history.

(56) References Cited

U.S. PATENT DOCUMENTS

| | | | | | |
|---|---|---|---|---|---|
| 4,302,718 | A | * | 11/1981 | Schade, Jr. ............. | G05F 3/267 323/313 |
| 5,085,526 | A | * | 2/1992 | Sawtell .................... | G05F 1/648 327/512 |
| 5,408,401 | A | * | 4/1995 | Miyazaki ................. | G05F 1/567 318/471 |
| 5,699,239 | A | * | 12/1997 | Komori ............... | G03G 15/2003 363/132 |
| 6,181,142 | B1 | | 1/2001 | Mallory | |
| 7,239,532 | B1 | * | 7/2007 | Hsu .................... | H02M 3/33523 363/21.12 |
| 7,436,685 | B2 | * | 10/2008 | Li ........................ | H02M 1/4225 363/21.01 |

(Continued)

FOREIGN PATENT DOCUMENTS

| | | |
|---|---|---|
| EP | 0102666 A2 | 3/1984 |
| EP | 0483852 A2 | 5/1992 |

(Continued)

OTHER PUBLICATIONS

Decision to Grant for Japanese Application No. 2016-017062, dated Apr. 25, 2017, and English translation.

*Primary Examiner* — Yusef Ahmed

(74) *Attorney, Agent, or Firm* — Renner, Otto, Boisselle & Sklar, LLP

(57) ABSTRACT

To provide a protection circuit that can reduce output voltage that is output from a switching power supply greatly when temperature rises. A protection circuit includes a comparator that supplies detection current based on voltage Vsens that a temperature sensor outputs in case that voltage Vsens that the temperature sensor outputs exceeds voltage Vref of predetermined potential, a control circuit that supplies control current that the control circuit increases detection current that the comparator supplies exponentially, and a constant voltage circuit reduces output voltage Vout that is output from a switching power supply based on control current that the control circuit supplies.

6 Claims, 4 Drawing Sheets

(56) References Cited

U.S. PATENT DOCUMENTS

| | | | |
|---|---|---|---|
| 2002/0015317 A1 | 2/2002 | Umetsu et al. | |
| 2009/0051345 A1* | 2/2009 | Ueno | H02M 3/3385 323/351 |
| 2009/0206912 A1* | 8/2009 | Igarashi | G01K 7/01 327/512 |
| 2009/0302822 A1* | 12/2009 | Chao | G05F 3/30 323/313 |
| 2010/0270973 A1* | 10/2010 | Miyazaki | H01M 10/441 320/120 |
| 2012/0113687 A1* | 5/2012 | Wildrick | H02M 3/3378 363/21.02 |
| 2014/0043867 A1* | 2/2014 | Sugawara | H02M 3/33523 363/21.15 |
| 2015/0131331 A1* | 5/2015 | Woo | H02M 3/33523 363/21.01 |
| 2015/0300858 A1* | 10/2015 | Matsumoto | G01F 1/696 324/538 |
| 2016/0036340 A1* | 2/2016 | Kikuchi | H02M 1/32 363/21.14 |
| 2016/0072399 A1* | 3/2016 | Kikuchi | H02M 3/33592 363/21.14 |
| 2016/0226388 A1* | 8/2016 | Ren | H02M 3/33507 |
| 2016/0261202 A1* | 9/2016 | Kikuchi | H02M 3/33523 |
| 2016/0301318 A1* | 10/2016 | Yamamoto | G03G 15/80 |
| 2016/0329820 A1* | 11/2016 | Mohtashemi | H02M 3/33523 |
| 2017/0077825 A1* | 3/2017 | Yamane | H02M 3/33507 |

FOREIGN PATENT DOCUMENTS

| | | |
|---|---|---|
| JP | 60-213264 A | 10/1985 |
| JP | 10-225116 A | 8/1998 |
| JP | 2000-136903 A | 5/2000 |
| JP | 2005-204458 A | 7/2005 |
| JP | 2007-174753 A | 7/2007 |
| JP | 2009-106610 | 5/2009 |
| JP | 4770446 B2 | 9/2011 |

* cited by examiner (a)

(b)

(c)

PROTECTION CIRCUIT AND SWITCHING POWER SUPPLY

BACKGROUND OF THE INVENTION

1. Field of the Invention

The present invention relates to a protection circuit for protecting a switching power supply from heat and the switching power supply.

2. Description of the Related Art

In a conventional protection circuit for protecting a switching power supply from heat, for example, a temperature sensor is provided near a heated part such as a transformer and a diode that is a rectifier element. For example, the temperature sensor outputs voltage that is proportional to detected temperature. When voltage that the temperature sensor outputs becomes voltage of predetermined potential, the protection circuit stops operation of the switching power supply (a first conventional example). For example, as the temperature sensor, a thermistor is used. The thermistor is an element that output voltage increases monotonously when element temperature rises. The protection circuit monitors the output voltage and when the output voltage becomes not less than predetermined potential, it stops operation of the switching power supply. However, in the first conventional example, there is a problem that a power supply becomes OFF when temperature exceeds constant temperature.

Further, for example, in an AV amplifier that amplifies an audio signal, technique that suppresses heat generation by monitoring temperature of a heat sink and by attenuating volume when temperature exceeds constant value is known (a second conventional example). However, in the second conventional example, there is a problem that cannot be handled by control of the amplifier when excessive current flows by failure of a secondary side condenser of the switching power supply.

FIG. 4 is a diagram of a circuit configuration of a protection circuit that is described in JP 4770446 B (a third conventional example). A shottky barrier diode D51B is incorporated in a secondary side rectifier diode D51A. Temperature of the secondary side rectifier diode D51A is detected by leakage current of the shottky barrier diode D51B. Control that reduces output voltage is performed by adding the leakage current to a reference terminal of a shunt regulator Z51. Namely, when temperature of the secondary side rectifier diode D51A rises, output voltage drops and electric power consumption gets smaller. However, in the third conventional example, there is a problem that it is not possible to set threshold at which output voltage begins to change. Further, there is a problem that it is necessary to use a special diode.

In the first to the third conventional example, there are problems mentioned above. A problem that it is not possible to reduce output voltage greatly even if temperature rises is in common among them.

SUMMARY OF THE INVENTION

An objective of the present invention is to provide a protection circuit that can reduce output voltage that is output from a switching power supply greatly when temperature rises.

A protection circuit comprising: a temperature sensor that outputs voltage based on temperature; a comparator that supplies detection current based on the voltage that the temperature sensor outputs in case that the voltage that the temperature sensor outputs exceeds voltage of predetermined potential; a control circuit that supplies control current obtained by exponentially increasing the detection current supplied from the comparator; and a constant voltage circuit that reduces output voltage that is output from a switching power supply based on the control current that the control circuit supplies.

In the present invention, a control circuit supplies control current obtained by exponentially increasing detection current supplied from a comparator. Further, a constant voltage circuit reduces output voltage that is output from a switching power supply based on the control current that the control circuit supplies. Therefore, when temperature rises, output voltage can be reduced greatly. Thus, it is not necessary that operation of a switching power supply is stopped even if temperature rises.

Preferably, wherein the temperature sensor is thermally coupled with a secondary side rectifier element that the switching power supply includes.

In the present invention, a temperature sensor is thermally coupled with a secondary side rectifier element that a switching power supply includes. Therefore, when temperature of the rectifier element rises, output voltage can be reduced greatly. Further, temperature of the rectifier element can be detected without using a special part.

Preferably, wherein the comparator has an npn type first bipolar transistor in which a base is connected to an output terminal of the temperature sensor, a collector is connected to the control circuit, and an emitter is connected to ground via a first resistor, a second resistor in which one end is connected to a power supply, and the other end is connected to one end of a third resistor, the third resistor in which one end is connected to the other end of the second resistor, and the other end is connected to the ground, and an npn type second bipolar transistor in which a base is connected to between the second resistor and the third resistor, a collector is connected to output of the switching power supply via a fourth resistor, and an emitter is connected to between the emitter of the first bipolar transistor and the first resistor, the detection current is collector current of the first bipolar transistor.

In the present invention, when voltage that the temperature sensor outputs exceeds base voltage of a second bipolar transistor, the comparator supplies the detection current. Herein, base voltage of a second bipolar transistor is a third resistor/(a second resistor+a third resistor)×power supply voltage. Therefore, threshold (base voltage of the second bipolar transistor) that output voltage begins to change can be set freely by adjusting resistor value of resistors and potential of power supply voltage.

Preferably, wherein the control circuit has a pnp type third bipolar transistor in which a base is connected to a base of a fourth bipolar transistor, an emitter is connected to output of the switching power supply via a fifth transistor, and a collector is connected to output of the comparator and the base of the third bipolar transistor, and a pnp type fourth bipolar transistor in which the base is connected to the base of the third bipolar transistor, an emitter is connected to output of the switching power supply, and a collector is connected to the constant voltage circuit, wherein the control current is collector current of the fourth bipolar transistor.

In the present invention, in a current mirror circuit by a third bipolar transistor and a fourth bipolar transistor, a fifth resistor is inserted into an emitter of the third bipolar transistor. Thus, balance of the current mirror circuit collapses, and control current that is collector current of the fourth bipolar transistor increases exponentially.

Preferably, wherein the constant voltage circuit has a sixth resistor in which one end is connected to output of the switching power supply, and the other end is connected to one end of a seventh resistor, the seventh resistor in which one end is connected to the other end of the sixth resistor, and the other end is connected to the ground, a shunt regulator in which a reference terminal is connected to between the sixth resistor and the seventh resistor, a cathode is connected to output of the switching power supply via an eighth resistor and a ninth resistor, and an anode is connected to the ground, and a photo coupler in which an anode of a light emitting diode is connected to between the eighth resistor and the ninth resistor, a cathode of the light emitting diode is connected to between the ninth resistor and the shunt regulator, a collector of a photo transistor is connected to a feedback terminal of a driver circuit, and an emitter of the photo transistor is connected to the ground, wherein output of the control circuit is connected to between the sixth resistor and the seventh resistor.

In the present invention, in a photo coupler, current of a light emitting diode increases or decreases based on increase or decrease of cathode sink current of a shunt regulator. Current of a photo transistor increases or decreases based on increase or decrease of current of the light emitting diode. Increase or decrease of the current of the photo transistor changes voltage of a feedback terminal of a driver circuit. Thus, the driver circuit changes duty of ON/OFF by a switching element based on change of voltage of the feedback terminal so as to adjust output voltage.

A switching power supply comprises the protection circuit.

According to the present invention, output voltage can be reduced greatly when temperature exceeds optional temperature and rises.

BRIEF DESCRIPTION OF THE DRAWINGS

FIG. 3(*b*) is a graph illustrating detection current.

FIG. 3(*c*) is a graph illustrating voltage that a temperature sensor outputs.

DETAILED DESCRIPTION OF THE PREFERRED EMBODIMENTS (Switching Power Supply)

Figure 1:
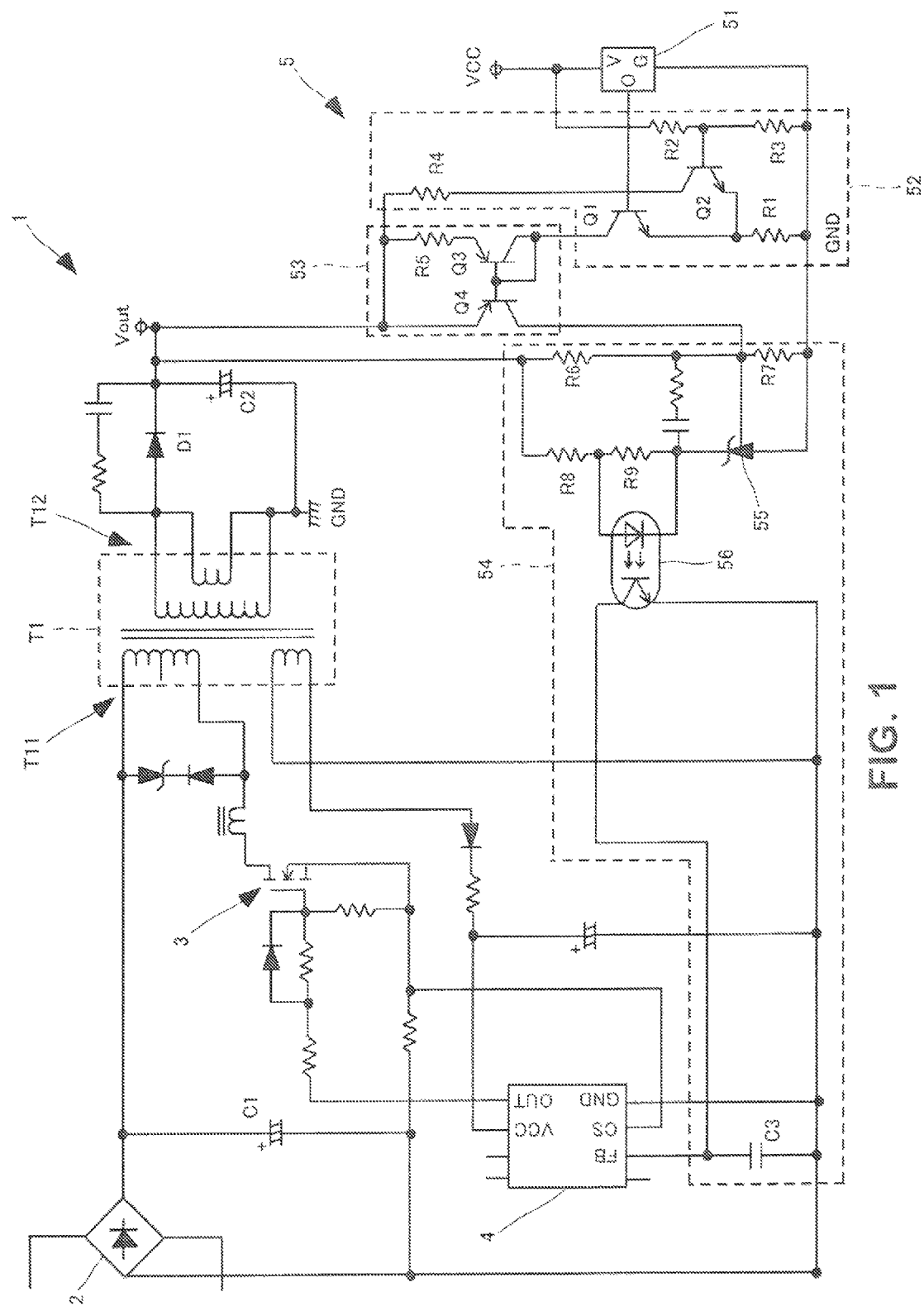
FIG. 1 is a diagram illustrating a circuit configuration of a switching power supply according to an embodiment of the present invention.

An embodiment of the present invention is described below. FIG. 1 is a diagram illustrating a circuit configuration of a switching power supply according to an embodiment of the present invention. The switching power supply 1 includes a rectifier circuit 2, a condenser C1, a switching element 3, a driver IC 4, a transformer T1, a diode D1, a condenser C2, and a protection circuit 5.

The rectifier circuit 2 rectifies AC voltage that is input from an AC power supply. The condenser C1 smooths voltage that the rectifier circuit 2 rectifies. Smoothed voltage is supplied to the switching element 3. The driver IC 4 controls the switching element 3. The switching element 3 is controlled by the driver IC 4 (driver circuit). The switching element 3 supplies AC voltage of optional frequency to a primary coil T11 of the transformer T1 by switching with optional frequency. For example, the switching element 3 is an n type MOS field-effect transistor. The switching element 3 supplies voltage from the condenser C1 or voltage of earth potential to the primary coil T11. The transformer T1 transforms voltage that is supplied to the primary coil T11 and outputs transformed voltage from the secondary coil T12. The diode D1 rectifies AC voltage from the secondary coil T12. The condenser C2 smooths voltage that the diode D1 rectifies. Voltage that the condenser C2 smooths is output voltage Vout of the switching power supply 1.

(Protection Circuit)

Figure 2:
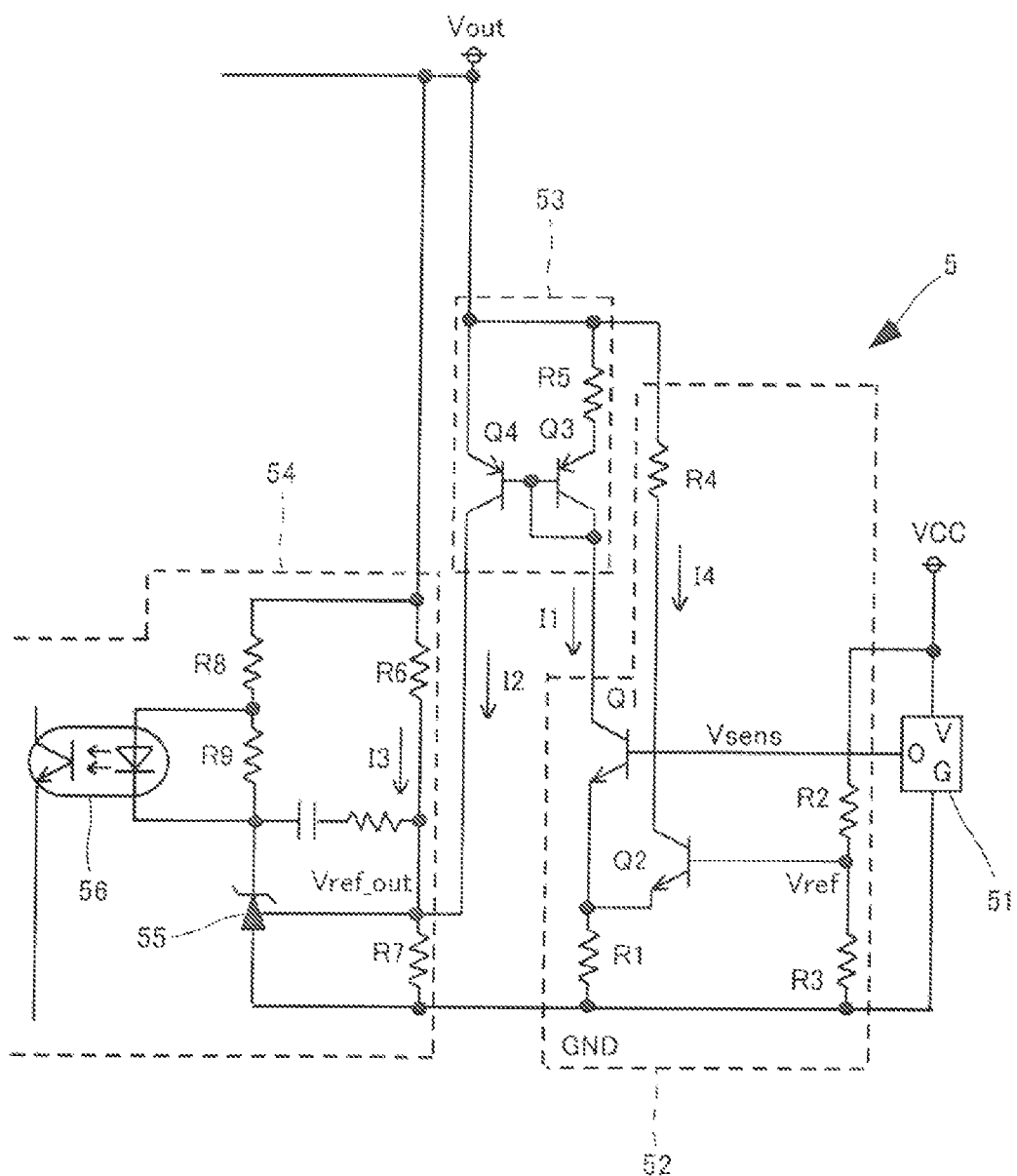
FIG. 2 is a diagram illustrating a main part of a protection circuit.

FIG. 2 is a diagram illustrating a main part of the protection circuit 5. As illustrated in FIGS. 1 and 2, the protection circuit 5 has a temperature sensor 51, a comparator 52, a control circuit 53, and a constant voltage circuit 54.

(Temperature Sensor)

The temperature sensor 51 outputs voltage Vsens that is proportional to temperature. The temperature sensor 51 is thermally coupled with the diode D1 that is a secondary side rectifier element. Therefore, the temperature sensor 51 detects temperature of the diode D1 and outputs voltage Vsens that is proportional to detected temperature. One terminal of the temperature sensor 51 is connected to a power supply VCC. The other terminal of the temperature sensor 51 is connected to ground GND. An output terminal of the temperature sensor 51 is connected to the comparator 52. Concretely, the output terminal of the temperature sensor 51 is connected to a base of a bipolar transistor Q1 that the comparator 52 has.

(Comparator)

The comparator 52 supplies detection current I1 based on voltage Vsens that the temperature sensor 51 outputs in case that the voltage Vsens that the temperature sensor 51 outputs exceeds voltage Vref of predetermined potential.

The comparator 52 has bipolar transistors Q1 and Q2, and resistors R1 to R4. The bipolar transistor Q1 (first bipolar transistor) is an npn type bipolar transistor. The base of the bipolar transistor Q1 is connected to the output terminal of the temperature sensor 51. A collector of the bipolar transistor Q1 is connected to the control circuit 53. Concretely, the collector of the bipolar transistor Q1 is connected to a collector of a bipolar transistor Q3 that the control circuit 53 has. An emitter of the bipolar transistor Q1 is connected to ground GND via the resistor R1 (first resistor).

One end of the resistor R2 (second resistor) is connected to the power supply VCC. The other end of the resistor R2 is connected to one end of the resistor R3. The other end of the resistor R3 (third resistor) is connected to the other end of the resistor R2. The other end of the resistor R3 is connected to ground GND.

The bipolar transistor Q2 (second bipolar transistor) is an npn type bipolar transistor. Abase of the bipolar transistor Q2 is connected to between the resistor R2 and the resistor R3. A collector of the bipolar transistor Q2 is connected to output of the switching power supply 1 via the resistor R4 (fourth resistor). An emitter of the bipolar transistor Q2 is connected to between the emitter of the bipolar transistor Q1 and the resistor R1.

(Control Circuit)

The control circuit 53 supplies control current I2 that the control circuit 53 increases detection current I1 that the comparator 52 supplies exponentially. The control circuit 53 has bipolar transistors Q3 and Q4, and the resistor R5. The bipolar transistor Q3 (third bipolar transistor) is a pnp type bipolar transistor. A base of the bipolar transistor Q3 is connected to a base of a bipolar transistor Q4. An emitter of the bipolar transistor Q3 is connected to output of the switching power supply 1 via the resistor R5. The collector of the bipolar transistor Q3 is connected to the base. Further, the collector of the bipolar transistor Q3 is connected to output of the comparator 52. Concretely, the collector of the bipolar transistor Q3 is connected to the collector of the bipolar transistor Q1 that the comparator 52 has.

The bipolar transistor Q4 (fourth bipolar transistor) is a pnp type bipolar transistor. The base of the bipolar transistor Q4 is connected to the base of the bipolar transistor Q3. An emitter of the bipolar transistor Q4 is connected to output of the switching power supply 1. A collector of the bipolar transistor Q4 is connected to the constant voltage circuit 54. Concretely, the collector of the bipolar transistor Q4 is connected to between a resistor R6 and a resistor R7 that the constant voltage circuit 54 has.

(Constant Voltage Circuit)

The constant voltage circuit 54 reduces output voltage Vout that is output from the switching power supply 1 based on control current I2 that the control circuit 53 supplies. The constant voltage circuit 54 has resistors R6 to R9, a shunt regulator 55, a photo coupler 56, and a condenser C3. One end of the resistor R6 (sixth resistor) is connected to output of the switching power supply 1. The other end of the resistor R6 is connected to one end of the resistor R7. One end of the resistor R7 (seventh resistor) is connected to the other end of the resistor R6. The other end of the resistor R7 is connected to ground GND.

A reference terminal of the shunt regulator 55 is connected to between the resistor R6 and the resistor R7. The collector of the bipolar transistor Q4 is connected to between the resistor R6 and the resistor R7. Due to this, collector current of the bipolar transistor Q4 flows to the reference terminal of the shunt regulator 55. A cathode of the shunt regulator 55 is connected to output of the switching power supply 1 via a resistor R8 (eighth resistor) and a resistor R9 (ninth resistor). An anode of the shunt regulator 55 is connected to ground GND.

The photo coupler 56 has a light emitting diode and a photo transistor. An anode of the light emitting diode is connected between the resistor R8 and the resistor R9. A cathode of the light emitting diode is connected to between the resistor R9 and the cathode of the shunt regulator 55. A collector of the photo transistor is connected to a feedback terminal FB of the driver IC 4. An emitter of the photo transistor is connected to ground GND. One end of the condenser C3 is connected to the feedback terminal FB of the driver IC 4 and the collector of the photo transistor. The other end of the condenser C3 is connected to ground GND.

(Operation of the Temperature Sensor and the Comparator)

The temperature sensor 51 is thermally coupled with the diode D1. Voltage Vsens of the output terminal of the temperature sensor 51 changes by temperature $T\_51$ of the temperature sensor 51. Voltage Vsens that is calculated by the following (formula 1) is output from the output terminal of the temperature sensor 51.

$$Vsens=(0.01 \times T\_51)+0.6 (V) \quad \text{(formula 1)}$$

In the present embodiment, a temperature sensor that has characteristics of (formula 1) is used. Base voltage Vref (voltage of predetermined potential) of the bipolar transistor Q2 is calculated by the following (formula 2).

$$Vref=R3/(R2+R3) \times VCC (V) \quad \text{(formula 2)}$$

In case of Vref>sens, collector current I4 of the bipolar transistor Q2 flows. In case of Vref<Vsens, collector current I1 (detection current) of the bipolar transistor Q1 flows.

Collector current I4 is calculated by the following (formula 3). "Vbe_Q2" is base-emitter voltage of the bipolar transistor Q2.

$$I4=(Vref-Vbe\_Q2)/R1 (A) \quad \text{(formula 3)}$$

Collector current I1 is calculated by the following (formula 4). "Vbe_Q1" is base-emitter voltage of the bipolar transistor Q1.

$$I1=(Vsens-Vbe\_Q1)/R1 (A) \quad \text{(formula 4)}$$

(Operation of the Control Circuit)

In case that current amplifier rate is large sufficiently, sum of base current of bipolar transistors Q3 and Q4 becomes smaller than collector current of the bipolar transistor Q3 sufficiently. For this reason, it is assumed that collector current of the bipolar transistor Q3 is equal to collector current I1 of the bipolar transistor Q1. Like above, value of I1 is calculated by (formula 4). Collector current I1 of the bipolar transistor Q3 is also calculated by (formula 4) similarly.

Base-emitter voltage Vbe_Q3 of the bipolar transistor Q3 is calculated by the following (formula 5). "T_Q3" is absolute temperature of the bipolar transistor Q3. "k" is Boltzmann constant (1.38×10^(−23)J/K). "q" is charge of electron (1.6×10^(−19)C). "Is_Q3" is saturation current of the bipolar transistor Q3.

$$Vbe\_Q3=(kT\_Q\_3/q) \times \log(I1/Is\_Q3)(V) \quad \text{(formula 5)}$$

Collector current I2 (control current) of the bipolar transistor Q4 is calculated by the following (formula 6). "T_Q4" is absolute temperature of the bipolar transistor Q4. "Is_Q4" is saturation current of the bipolar transistor Q4.

(A)

$$\begin{aligned} I2 &= Is\_Q4 \times \exp\{(Vbe\_Q3 + R5 \times I1)/(k \times T\_Q4/q)\} \\ &= Is\_Q4 \times I1/Is\_Q3 \times \exp(T\_Q3/T\_Q4) \times \\ &\quad \exp(R5 \times I1/(k \times T\_Q4/q)) \end{aligned} \quad \text{(formula 6)}$$

In case that temperature and saturation current of the bipolar transistor Q3 and the bipolar transistor Q4 is equal, namely, in case of Is_Q3=Is_Q4 and T_Q3=T_Q4, I2 becomes (formula 7).

$$I2=I1 \times e \times \exp(R5 \times I1/(k \times T\_Q4/q))(A) \quad \text{(formula 7)}$$

Like this, control current I2 increases based on detection current I1 exponentially. Herein, in a current mirror circuit by bipolar transistors Q3 and Q4, by inserting the resistor R5 into the emitter of the bipolar transistor Q3, balance of the current mirror circuit collapses and control current I2 becomes the above.

(Operation of the Constant Voltage Circuit)

The shunt regulator 55 adjusts sink current of the cathode so that reference terminal voltage Vref_out becomes constant value (for example, 2.495 V). Output voltage Vout is calculated by the following (formula 8).

$$Vout=((R6+R7)/R7) \times Vref\_out-R6 \times I2$$

Therefore, when I2 increases, output voltage Vout reduces.

In the photo coupler 56, current of the light emitting diode increases or decreases based on increase or decrease of cathode sink current of the shunt regulator 55. Current of the photo transistor increases or decreases based on increase or decrease of current of the light emitting diode. Increase or decrease of current of the photo transistor changes voltage of the feedback terminal FB of the driver IC 4. The driver IC 4 changes duty of ON/OFF by the switching element 3 based on the voltage change of the feedback terminal FB so as to adjust output voltage Vout.

Figure 3:
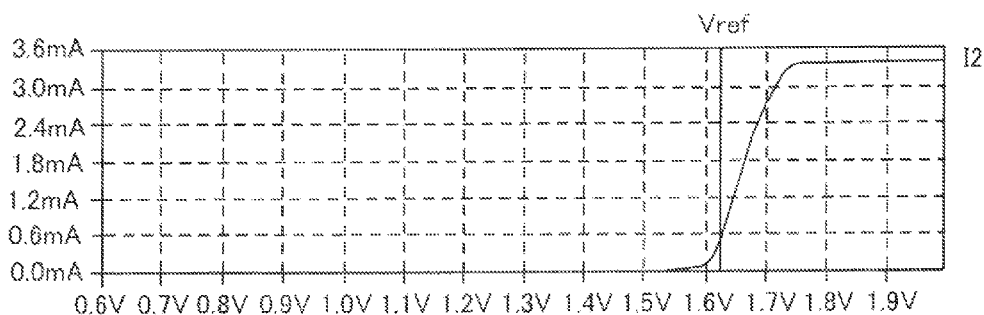
FIG. 3(*a*) is a graph illustrating control current.
Figure 3:
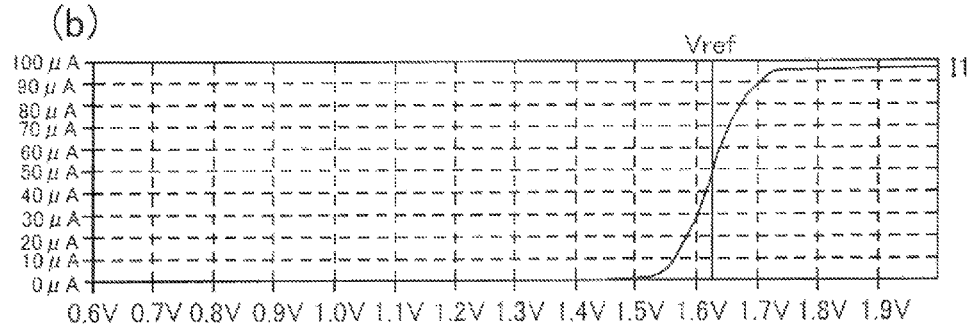
Figure 3:
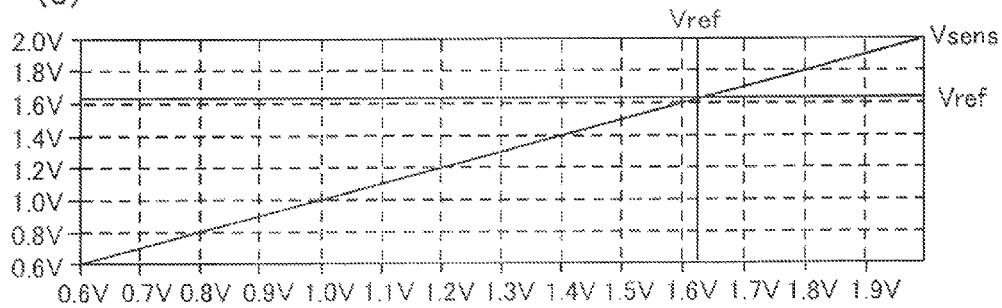
Figure 4:
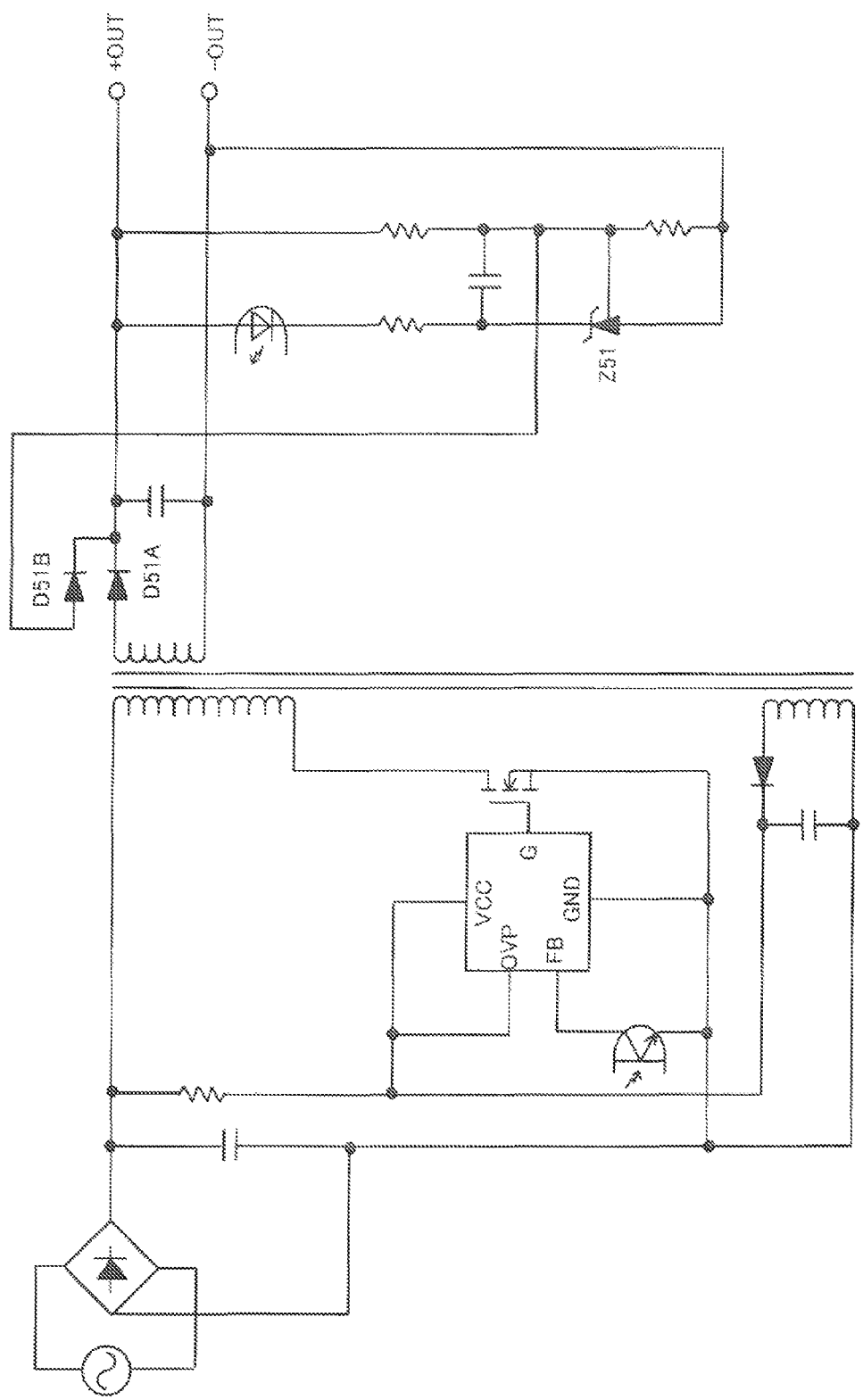
FIG. 4 is a diagram illustrating a circuit configuration of a protection circuit that is described in JP 4770446 B.

FIG. 3(a) is a graph illustrating control current I2. FIG. 3(b) is a graph illustrating detection current I1. FIG. 3(c) is a graph illustrating voltage Vsens that the temperature sensor 51 outputs. In case of Vref≃Vsens, current characteristics becomes characteristics illustrated in FIG. 3 because there is range where both of the bipolar transistors Q1 and Q2 operate in active area. In case that Vsens becomes not less than 1.7 V and I1 and I2 clip, the bipolar transistor Q4 saturates in R7×I2≃Vout.

As described in the above, in the present embodiment, the control circuit 53 supplies control current I2 that the control circuit 53 increases detection current I1 that the comparator 53 supplies exponentially. Further, the constant voltage circuit 54 reduces output voltage Vout that is output from the switching power supply 1 based on control current I2 that the control circuit 53 supplies. Therefore, when temperature rises, output voltage Vout can be reduced greatly. Thus, it is not necessary that operation of the switching power supply 1 is stopped even if temperature rises.

Further, in the present embodiment, the temperature sensor 51 is thermally coupled with the diode D1 that is a secondary side rectifier element that the switching power supply 1 includes. Therefore, when temperature of the diode D1 rises, output voltage Vout can be reduced greatly. Further, temperature of the diode D1 can be detected without using a special part.

Further, in the present embodiment, when voltage Vsens that the temperature sensor 51 outputs exceeds base voltage Vref of the bipolar transistor Q2, the comparator 52 supplies detection current I1. Herein, base voltage Vref of the bipolar transistor Q2 is indicated by (formula 2). Therefore, threshold Vref (base voltage of the bipolar transistor Q2) that output voltage Vout begins to change can be set freely by adjusting resistor values of the resistors R2 and R3 and potential of power supply voltage VCC.

Further, in the present embodiment, in the current mirror circuit by the bipolar transistors Q3 and Q4, the resistor R5 is inserted into the emitter of the bipolar transistor Q3. Thus, balance of the current mirror circuit collapses, and control current I2 that is collector current of the bipolar transistor Q4 increases exponentially.

Further, in the present embodiment, in the photo coupler 56, current of the light emitting diode increases or decreases based on increase or decrease of cathode sink current of the shunt regulator 55. Current of the photo transistor increases or decreases based on increase or decrease of current of the light emitting diode. Increase or decrease of the current of the photo transistor changes the voltage of the feedback terminal FB of the driver IC 4. Thus, the driver IC 4 changes duty of ON/OFF by the switching element 3 based on change of voltage of the feedback terminal FB so as to adjust output voltage Vout.

The embodiment of the present invention is described above, but the mode to which the present invention is applicable is not limited to the above embodiment and can be suitably varied without departing from the scope of the present invention.

In the above mentioned embodiment, the temperature sensor 51 is thermally coupled with the diode D1. Not limited to this, the temperature sensor 51 may be thermally coupled with the other element.

In the above mentioned embodiment, the temperature sensor 51 outputs voltage Vsens that is proportional to temperature. Not limited to this, a temperature sensor that outputs voltage based on temperature may be used. For example, as a temperature sensor, like a thermistor, an element that output voltage increases monotonously when element temperature rises may be used.

The present invention can be suitably employed in a protection circuit for protecting a switching power supply from heat and the switching power supply.

What is claimed is:

1. A protection circuit comprising: a temperature sensor that outputs voltage based on temperature;
   a comparator that supplies detection current based on the voltage that the temperature sensor outputs in case that the voltage that the temperature sensor outputs exceeds voltage of predetermined potential;
   a control circuit that supplies control current obtained by exponentially increasing the detection current supplied from the comparator; and
   a constant voltage circuit that reduces output voltage that is output from a switching power supply based on the control current that the control circuit supplies, wherein the constant voltage circuit includes a shunt regulator that is controlled based on the control current.

2. The protection circuit according to claim 1, wherein the temperature sensor is thermally coupled with a secondary side rectifier element that the switching power supply includes.

3. The protection circuit according to claim 1, wherein the comparator has
   an npn type first bipolar transistor in which a base is connected to an output terminal of the temperature sensor, a collector is connected to the control circuit, and an emitter is connected to ground via a first resistor,
   a second resistor in which one end is connected to a power supply, and the other end is connected to one end of a third resistor,
   the third resistor in which one end is connected to the other end of the second resistor, and the other end is connected to the ground, and
   an npn type second bipolar transistor in which a base is connected between the second resistor and the third resistor, a collector is connected to an output of the switching power supply via a fourth resistor, and an emitter is connected between the emitter of the first bipolar transistor and the first resistor,
   the detection current is a collector current of the first bipolar transistor.

4. The protection circuit according to claim 1, wherein the control circuit has
   a pnp type third bipolar transistor in which a base is connected to a base of a pnp-type fourth bipolar transistor, an emitter is connected to an output of the switching power supply via a fifth transistor, and a collector is connected to an output of the comparator and the base of the third bipolar transistor, and
   the pnp type fourth bipolar transistor in which the base is connected to the base of the third bipolar transistor, an emitter is connected to output of the switching power supply, and a collector is connected to the constant voltage circuit,
   wherein the control current is a collector current of the fourth bipolar transistor.

5. The protection circuit according to claim 1, wherein the constant voltage circuit has
   a sixth resistor in which one end is connected to an output of the switching power supply, and the other end is connected to one end of a seventh resistor, the seventh resistor in which the one end is connected to the other end of the sixth resistor, and the other end is connected to a ground, the shunt regulator in which a reference terminal is connected between the sixth resistor and the seventh resistor, a cathode is connected to the output of the switching power supply via an eighth resistor and a ninth resistor, and an anode is connected to the ground, and a photo coupler in which an anode of a light emitting diode is connected between the eighth resistor and the ninth resistor, a cathode of the light emitting diode is connected between the ninth resistor and the shunt regulator, a collector of a photo transistor is connected to a feedback terminal of a driver circuit, and an emitter of the photo transistor is connected to the ground, wherein an output of the control circuit is connected between the sixth resistor and the seventh resistor.

6. A switching power supply, comprising:
a switching element; and
a protection circuit comprising:
   a temperature sensor that outputs voltage based on temperature;
   a comparator that supplies detection current based on the voltage that the temperature sensor outputs in case that the voltage that the temperature sensor outputs exceeds voltage of predetermined potential;
   a control circuit that supplies control current obtained by exponentially increasing the detection current supplied from the comparator; and
   a constant voltage circuit that reduces output voltage that is output from the switching power supply based on the control current that the control circuit supplies, wherein the constant voltage circuit includes a shunt regulator that is controlled based on the control current.

* * * * *